Aug. 7, 1928.
E. ROBERTS
1,680,257
GYRATORY CENTRIFUGAL
Filed May 9, 1925  2 Sheets-Sheet 1
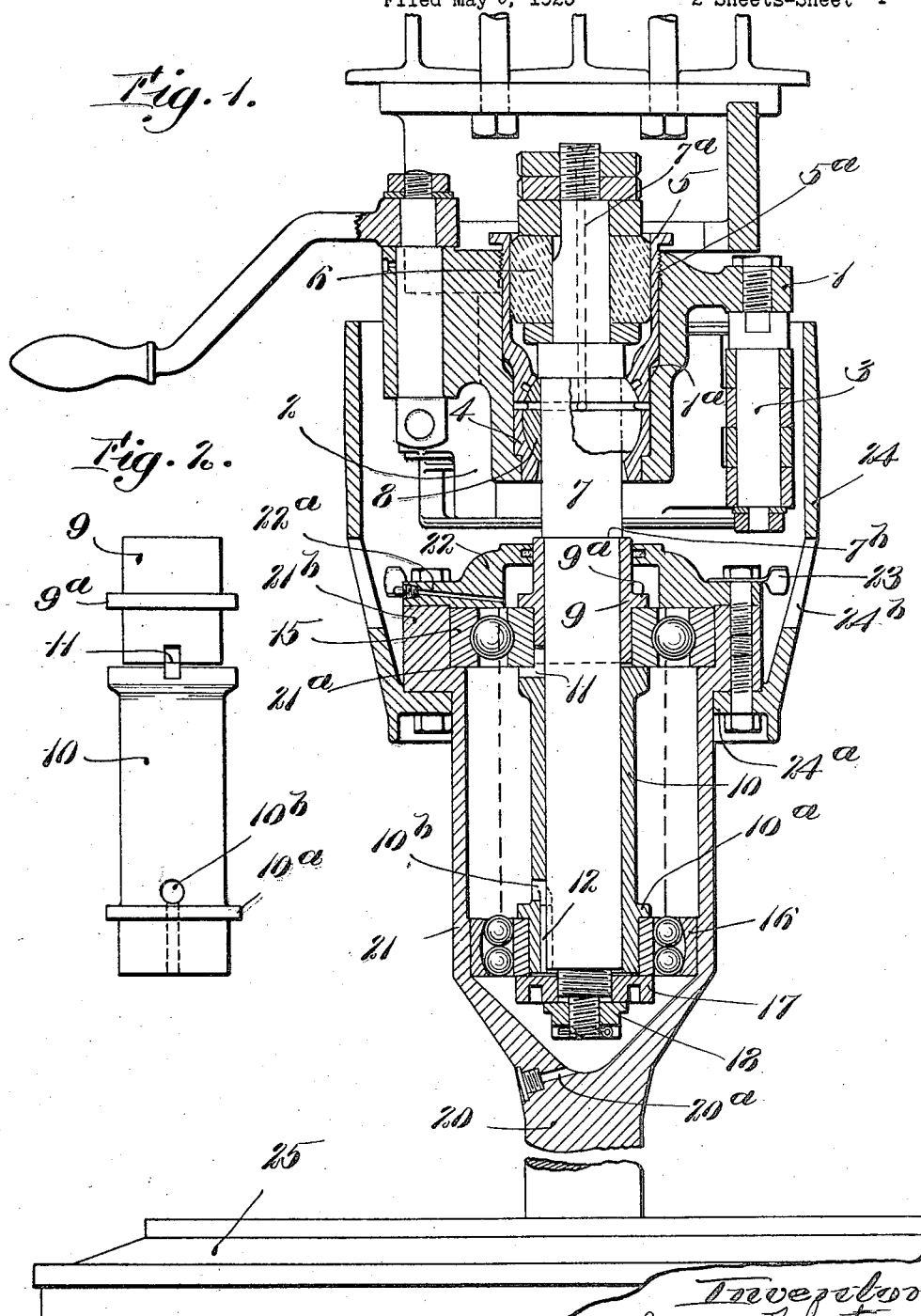
Inventor.
Eugene Roberts,
by Geo. N. Goddard, Atty.

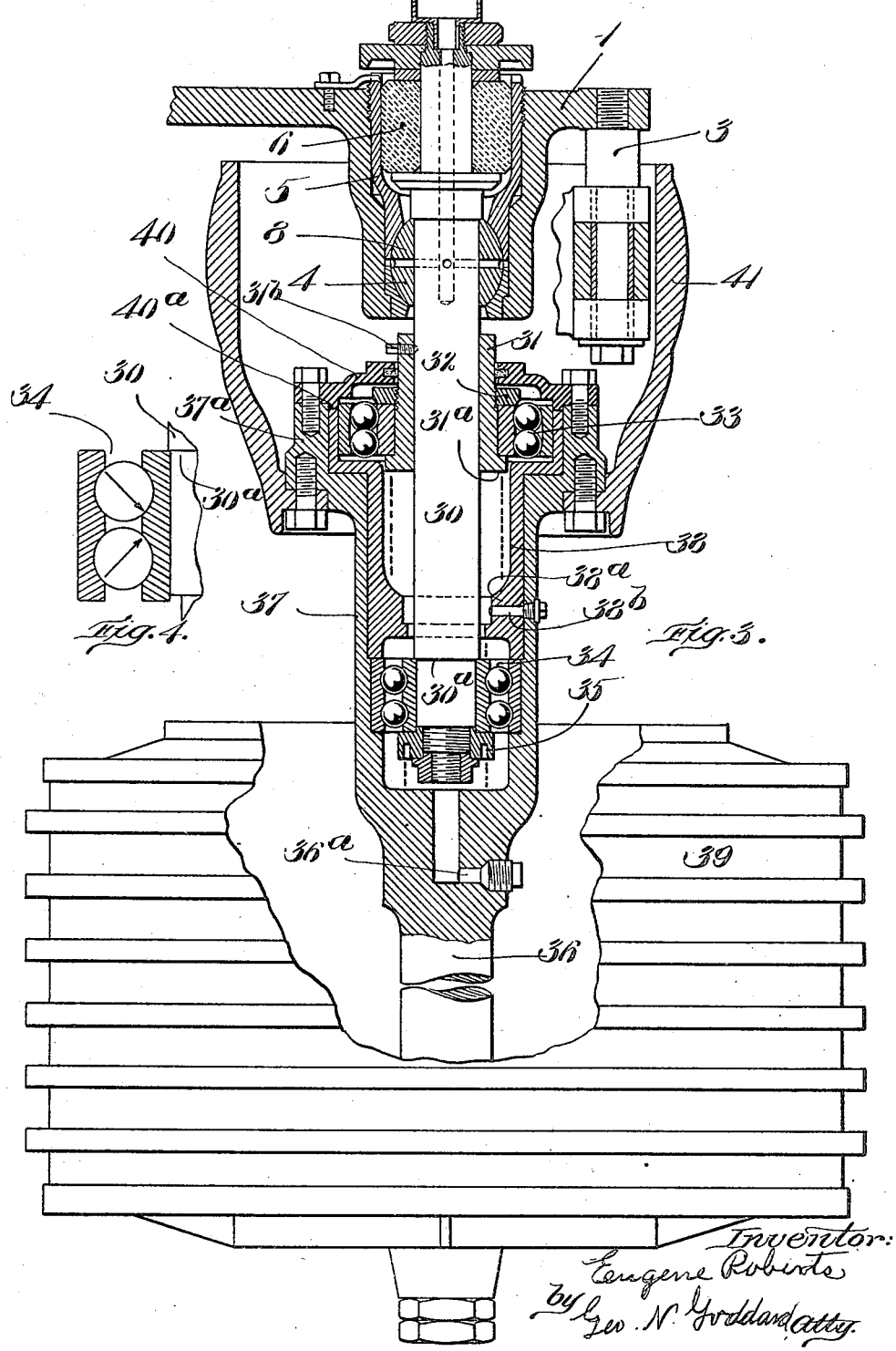

Patented Aug. 7, 1928.

1,680,257

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

GYRATORY CENTRIFUGAL.

Application filed May 9, 1925. Serial No. 29,231.

This invention relates to centrifugal machines of the overhead suspension type in which a rotary basket shaft is carried by a non-rotative suspension spindle that is suspended from a universal joint to permit gyration against yielding centralizing resistance, and is intended to improve the operation and simplify the construction of such machines, while making it easy to properly lubricate the bearings and dismount the machine, without danger of leakage or spilling of the lubricant into the underneath basket.

With these and other objects in view the invention consists, generally speaking, in the combination with a suspended gyratory spindle provided with upper and lower anti-friction radial bearings, of a basket shaft whose upper end portion is enlarged to form a hollow chamber for receiving the spindle and the anti-friction bearings and affording lubrication therefor. At the same time the basket shaft may be easily and quickly dismounted without gaining access to the interior spindle, by reason of the fact that the basket load is carried through the medium of an external thrust member detachably secured to the upper end of the chambered portion of the rotary basket shaft.

This and other features of the invention will be particularly described in the following specification and will be defined in the claims hereto annexed.

In the accompanying drawings I have illustrated two somewhat different forms of construction and arrangement embodying the principles of this invention, both employing upper and lower anti-friction radial bearings, one of which serves also to sustain the axial thrust in both directions of the basket shaft upon its suspension spindle.

In said drawings:

Figure 1 is a vertical central section showing the details of construction of the overhead hanger, the gyratory suspension spindle and the rotary basket shaft.

Figure 2 is a detail view showing the spacing means interposed between the two bearing elements and acting, in part, to transmit the downward thrust or load to the thrust nut or member secured to the lower end of the gyratory spindle.

Figure 3 is a similar view showing a modified form of construction in which the lower, instead of the upper, radial bearing element sustains the axial thrust of the load.

Figure 4 is a detail view showing, on an enlarged scale, a cross section through one side of the lower radial and thrust bearing.

In the practice of this invention, according to the forms illustrated in Figures 1 and 2, I employ a well-known type of fixed hanger 1, secured to horizontal I-beams or framework, and provided with an interior socket $1^a$ for the reception of a spherically curved lower socket member 4, and a correspondingly curved upper socket member 5, which latter has threaded engagement at $5^a$ with the hanger to enable it to be turned down into snug engagement with the upper portion of the spherically curved ball member 8, which is secured around the gyratory spindle 7. An interposed centralizing and elastic buffer 6, between the upper end of the spindle and the surrounding socket wall, opposes a yielding centralizing resistance to the gyration of the non-rotating spindle 7. To prevent heating and uneven resistance to sway, the upper end of the shaft 7 is provided with an interior grease duct $7^a$, having radial outlet passages leading to the exterior of the ball 8. This arrangement permits the requisite gyration of the centrifugal, while positively preventing any lifting of the spindle under strains producing upward thrust.

Immediately below the hanger the spindle is preferably reduced in diameter to form an annular shoulder $7^b$. A collar 9, provided with a peripheral flange or shoulder $9^a$, is slipped over the lower end of the spindle until it abuts against said shoulder $7^b$, and an anti-friction ball bearing element 15, comprising outer and inner deeply cut race members, containing the bearing balls, is slipped over the lower end of said collar 9 until the inner race member abuts against the shoulder $9^a$. To support this upper anti-friction element in position, a thrust or spacing collar 10 is then slipped over the lower end of the spindle 7 until it abuts against the lower face of the inner race member of the bearing. Before assembling the collar 10 an L-shaped key 11 is placed in the radial slots or key-ways formed in the adjacent ends of the collars 9 and 10, in order to key together the two collars to prevent rotative movement of one in relation to the other.

An additional spline or key 12 is inserted in aligned vertical slots formed in the lower ends of the spindle 7 and of the collar 10 to prevent rotative movement of the collar on the spindle.

The collar 10 has, near its lower end, an annular flange or shoulder 10ª against which is placed the lower anti-friction radial bearing element 16, and a spanner nut 17, having threaded engagement with the downward extension of the spindle, serves to secure this lower bearing element firmly against shoulder 10ª. A locked nut 18, or similar device, may be used to prevent accidental loosening of the thrust nut 17.

It will, therefore, be seen that the bearing thrust-transmitting elements are all easily assembled and removed over the lower end of the spindle without requiring the withdrawal of the spindle itself.

The rotary basket-shaft 20 is of novel construction. It is formed with an enlarged hollow upper end 21 which has sufficient axial length or depth to surround both anti-friction bearing elements and forms, not only a bearing containing oil, but also an oil-containing chamber.

The lower bearing element has no vertical thrust engagement with the inner wall of the chamber, while the upper bearing element 15 rests on an annular ledge or shoulder 21ª, formed in the offset rim portion 21ᵇ of the chamber. An annular cover 22 is bolted firmly to the rim 21ᵇ, with its lower face forming a shoulder abutting against the upper face of the outside race of the upper bearing element. This cover itself is made preferably in the shape of an inverted cup and is provided with an oil supply duct 22ª normally closed by a plug, and having its inner end terminating preferably inside the oil line established by the rotation of the shaft which is indicated in vertical broken lines on Figure 1.

It will be understood that this cover 22 is slipped over the upper end of the flanged collar 9 before the latter is slipped over the spindle so that, when the hollow basket-shaft is slipped over the two bearing members, the cover is in position for attachment to the upper end or rim portion 21ᵇ of the shaft. Oblique sheet metal vanes 23 may be held in a peripheral arrangement around the edge of the cover to permit a circulation of air for the purpose of cooling the brake pulley 24 which, in this case, is also the driving pulley as its exterior is adapted to receive a driving belt.

Any suitable form of expanding brake may be used, the brake shoes 21 being pivotally mounted on the vertical pin 3, carried by fixed hanger 1, so as to be expanded against the interior of the pulley. Details are unnecessary as the brake forms no part of this invention.

The pulley 24 is provided with an inwardly projecting attaching flange 24ª which fits underneath the rim member 21ᵇ of the hollow extension of the shaft and is securely bolted thereto.

A draw-off duct 20ª, leading to the interior portion of the conical bottom of the chamber, serves to draw off old oil when it is desired to renew the supply through the duct 22ª.

The lower bearing 16, in this form of the invention, is constructed as a simple radial bearing. The upper antifriction bearing element 15, with its larger bolts, and its deeply cut ball races, forms not only an anti-friction radial bearing, but also an anti-friction thrust-resisting bearing resisting both upward and downward thrust of the basket or load. The cover 22 not only confines the oil and excludes dust from the oil chamber, but it also transmits the load thrust to the deeply set bearing bolts, and when detached from the upper end of the basket shaft, permits withdrawal of the basket shaft from the spindle and bearings. It will also be noticed that all the bearing parts are removable from the spindle, and if the spindle is to be withdrawn for any reason, the removal of the upper socket member 5 permits the easy withdrawal of the spindle through the top of the hanger. It will also be seen that there is no joint between the upward extension of the shaft, forming the oil chamber, and the solid lower portion of the shaft so that there is no danger of leakage, such as would attend joining the hollow extension of the shaft to the lower solid extension of the shaft. Again, even if considerable oil remains in the oil chamber, it is all retained in the oil chamber when the shaft is withdrawn from the spindle.

To facilitate the removal of the spline or key 12, by which the collars 9 and 10 are prevented from slipping around the spindle, I provide a hole 10ᵇ through the collar 10, through which access may be gained to the upper end of the key to drive it out if it sticks after the thrust nut 17 has been removed.

In the modified arrangement, as shown in Figures 3 and 4, the means of supporting the gyratory non-rotating spindle 30 is similar to that above described, comprising the fixed socketed hanger 1, upper and lower spherically curved socket member 4 and 5 and a centralizing yielding buffer 6.

In this form, however, the lower of the two radial bearing elements is constructed to sustain the axial thrust in both directions, while the upper bearing element 33 serves merely as a radial bearing to sustain lateral thrust or pressure.

In this case the bearing supporting collar 31, with its annular shoulder 31ª, is secured to the spindle merely by means of a set screw 31ᵇ, as it does not sustain any substantial axial thrust. The upper radial bearing element 33 is held against the shoulder 31ª by a threaded clamping collar 32. The lower end portion of the spindle is formed with an annular thrust shoulder 30ª, against which the lower anti-friction element 34 is held by means of the thrust nut 35, secured to the threaded end of the spindle.

The solid basket shaft 36, with its upward hollow extension 37, has an offset rim 37ª which receives a stepped internal collar or sleeve 38, which transmits the weight of the load from the thrust cover element 40 to the lower anti-friction bearing element 34, so that the load is transmitted through a shaft extension 37, the cover 40 and the stepped lining or sleeve 38 to the outer race of the ball-bearing element 34, the balls being seated in grooves of sufficient depth to sustain the thrust in both directions, as diametrically illustrated in Figure 4. The shaft is also provided with a draw-off orifice normally closed by the plug 36ª.

Any tendency of the shaft to ride upward, under lifting strains caused by its swinging movement against the buffer 6 as a fulcral, is resisted by direct thrust against the lower end of the outer ball-bearing race 34 and the annular shoulder 30ª, formed on the spindle.

In this case also the shaft may be removed on disconnecting the attaching bolts of the cover 40, after which the remaining bearing elements may be removed over the lower end of the spindle, if desired.

In both cases the construction provides positive bearings to prevent the lifting of the basket-shaft and of the spindle besides sustaining the load at all times by well lubricated anti-friction bearings. The stepped lining or sleeve of the modified form is provided with an inwardly projecting shoulder, as shown at 38ᵇ, through which extends the oil supply passage 38. The object of this arrangement is to establish a definite level of oil when filling the oil chamber, since any excess will flow out through the duct 38, while also carrying the inner end of the supply duct 38ᵇ inward beyond the oil line established when the machine is rotating, as indicated by the vertical dotted lines, so as to afford complete lubrication without danger of leakage. The basket 39 is of similar construction to the basket 35 of the other form, and is attached to the lower end of the shaft in the same manner.

What I claim is:

1. A gyratory centrifugal embracing in combination a non-rotating spindle suspended at its upper end on a universal joint, a rotary basket-shaft, whose upper end is enlarged and made hollow to surround the spindle and form a bearing receiving an oil supply chamber integral with the shaft, upper and lower anti-friction radial bearing elements interposed between said spindle and the surrounding wall of said chamber, one of said radial bearing elements being arranged to sustain axial thrust of the shaft in both directions.

2. The combination of a non-rotating gyratory spindle suspended from a universal joint to gyrate against yielding centralizing resistance, a rotary basket shaft embracing an enlarged hollow upper end portion forming an oil chamber around the spindle, upper and lower anti-friction radial bearing elements mounted in axially spaced relation on said spindle to sustain the lateral thrust of the surrounding wall of said chamber, one of said radial bearing elements acting to sustain the axial thrust of the shaft in both directions, and a thrust element detachably secured to the upper end of said chamber.

3. The combination of a gyratory suspension spindle suspended from a universal joint, a rotary basket shaft whose enlarged hollow upper end portion surrounds the spindle below said joint and forms an integral bearing-receiving oil chamber, upper and lower anti-friction radial bearing elements interposed between the spindle and the surrounding wall of said chamber, and means detachably secured to the upper end of said chamber for transmitting the weight of the load to one of said bearings and when detached permitting the withdrawal of the shaft and of both bearing elements from the spindle.

4. The combination of a gyratory spindle suspended from a universal joint, upper and lower anti-friction radial bearing elements mounted on said spindle to permit their withdrawal from the lower end of said spindle, a basket shaft provided at its upper end with an enlarged hollow extension forming an oil and bearing chamber surrounding said bearings, and a cover detachably secured to said chamber arranged to transmit the load thrust to one of said bearings and permit direct access to both bearings by the withdrawal of the shaft.

5. The combination of a gyratory suspension spindle, upper and lower encircling anti-friction bearing elements held in spaced relation by means of removable thrust-transmitting collars, a basket shaft having an enlarged hollow upper end portion adapted to surround and have supporting engagement with said bearing elements for which it forms an oil chamber, and a detachable cover provided with an oil supply duct whose inner end extends inwardly beyond the walled up body of oil during the normal rotation of the basket shaft.

6. In a gyratory centrifugal, the combination of a gyratory suspension spindle suspended in hollow spherically curved socket members to prevent vertical movement of the spindle in either direction, upper and lower thrust collars secured to said spindle below its suspension point, said thrust collars being keyed together and one of them being keyed to the spindle to prevent rotary movement thereon, a basket-carrying shaft having an enlarged hollow upper end portion, anti-friction radial bearing elements interposed between the upper and lower portions of said hollow portion of the shaft and the respective thrust collars, the upper radial bearing element having mutual engagement with the shaft and with the thrust collars to prevent vertical movement in either direction of the shaft with relation to its gyratory suspension spindles, substantially as described.

In witness whereof, I have subscribed the above specification.

EUGENE ROBERTS.